United States Patent [19]

Tanabe et al.

[11] Patent Number: 5,304,422
[45] Date of Patent: Apr. 19, 1994

[54] LOW FRICTION POLYAMIDE, POLYETHYLENE, P.T.F.E. RESIN

[75] Inventors: Takayoshi Tanabe; Takatoshi Ishigaki; Shuji Tsuchikawa; Shinichi Kimura, all of Tokyo, Japan

[73] Assignee: Bando Chemical Industries, Ltd., Japan

[21] Appl. No.: 585,001

[22] Filed: Sep. 19, 1990

[51] Int. Cl.$^5$ .................. C08L 69/00; B32B 9/00; D02G 32/00

[52] U.S. Cl. .................. 428/392; 428/421; 428/423.5; 428/474.4; 428/500; 428/902; 524/514; 524/520; 524/521; 524/522; 524/525; 525/183; 525/184

[58] Field of Search ............ 428/224, 287, 267, 474.4, 428/392, 423.5; 525/483, 179, 425, 184, 183, 146, 154, 116, 400, 420, 425, 432, 433; 524/500, 902, 421, 495, 520, 521, 514, 524, 525

[56] References Cited

U.S. PATENT DOCUMENTS

| | | | |
|---|---|---|---|
| 4,737,539 | 4/1988 | Jinno et al. | 525/179 |
| 4,877,813 | 10/1989 | Jinno et al. | 525/179 |
| 5,154,673 | 10/1992 | Fukunaga et al. | 474/70 |

FOREIGN PATENT DOCUMENTS 1-247458 10/1989 Japan.
1-279963 11/1989 Japan.

OTHER PUBLICATIONS

Antifriction Polymeric Compositions and its Preparation, Vakar, A. A. et al., Apr. 1990, From Otkrytiya, Izodret pp. 139-140.

Primary Examiner—Patrick J. Ryan
Assistant Examiner—Richard C. Weisheiger
Attorney, Agent, or Firm—Marshall, O'Toole, Gerstein, Murray & Bicknell

[57] ABSTRACT

A polyamide resin composition comprising: (a) 100 parts by weight of a polyamide; (b) from about 1 part to about 80 parts by weight of an aromatic polyamide fiber; (c) from about 3 parts to about 80 parts by weight of a polytetrafluoroethylene; and (d) from about 1 part to about 20 parts by weight of high-density polyethylene is disclosed. The polyamide resin composition can be molded into sliding members, like bearings, bushings and slide rails, that demonstrate excellent mechanical and physical properties, like low frictional force, low self-abrasion, and low abrasion to metals.

14 Claims, No Drawings

LOW FRICTION POLYAMIDE, POLYETHYLENE, P.T.F.E. RESIN

FIELD OF THE INVENTION

The present invention relates to a polyamide resin composition, and more specifically to a polyamide resin composition that demonstrates sufficient mechanical properties, heat resistance, and fluidity in the molten state and that is suitable for the manufacture of sliding members having a low frictional force to metal, a low self-abrasion and a low abrasion to metal.

BACKGROUND OF THE INVENTION

Polyamides have been employed as a useful resin for a considerable time. In particular, polytetramethyleneadipamide, hereinafter referred to as nylon 46, is a useful polyamide that demonstrates heat resistance, toughness and chemical resistance. These properties are important in compounds used as structural materials. Since nylon 46 also exhibits good self-lubricity in comparison to other resins, nylon 46 can be used in sliding members such as bearings, gears, and other mechanical parts requiring high abrasion resistance.

Recently, plastic sliding members have been used extensively in bearings that are severely abraded; in non-lubricated systems under heavy load; in bushings used at elevated temperatures; or in sliding members having a small wall thickness. The performance tolerances of plastic sliding members operating under such conditions have become more stringent.

In general, in applying a plastic to sliding members such as bearings, it is desirable to select a plastic that possesses suitable mechanical properties, such as rigidity, creep resistance, and resistance to heat at deformation temperatures and at continuous operating temperatures. In addition, the plastic should possess suitable sliding properties, such as a low dynamic friction coefficient, a high critical pressure velocity a small abrasion loss and a low tendency to abrade a metal in frictional contact with the plastic.

A polyamide resin, and in particular, nylon 46, demonstrates excellent mechanical properties and excellent heat resistance. However, nylon 46 has not demonstrated the suitable sliding properties, such as low friction and high abrasion resistance, that are required in sliding members. Therefore, in order to improve sliding properties of a polyamide resin, like nylon 46 for example, Japanese Patent Provisional Publication No. 62-185747 proposed a method of adding polytetrafluoroethylene and potassium titanate to nylon 46.

However, as equipment performance requirements have increased, downsizing and reduction in wall thickness of the sliding members also have increased. In particular, the demand for thin-walled sliding members has increased. Nylon 46 can exhibit improved sliding properties by the above-mentioned polytetrafluoroethylene and potassium titanate treatment, but the resin nevertheless exhibits poor fluidity in the molten state compared to other polyamides. Fluidity in the molten state is important because fluidity helps allow the downsizing and the wall-thickness reduction of the sliding member. Therefore, it would be desirable to provide a polyamide resin composition that demonstrates excellent mechanical properties, and that also demonstrates a sufficient fluidity in the molten state.

In general, previous methods for imparting fluidity to the molten resin included adding a hydrocarbon, like a paraffin or a polyethylene wax; a metallic soap, like calcium stearate or lead stearate; a long-chain carboxylic acid, like stearic acid; an amide compound, like amidopalmitic acid or ethylenebisstearylamide; an ester compound like stearic acid monoglyceride or cetyl palmitate; an alcohol, like mannitol or stearyl alcohol; or a polymer, like a polyethylene, a polypropylene or a polyethylene oxide.

However, the addition of a low molecular weight compound, such as a hydrocarbon, a metallic soap, a long-chain carboxylic acid, an amide compound, an ester compound or an alcohol, adversely affects the surface appearance and mechanical properties of the polyamide. The addition of a polymer, such as polyethylene or polypropylene, leads to a phase separation due to a poor compatability between the polymer and the polyamide, and also adversely affects the mechanical properties and heat resistance of the polyamide. Furthermore, because the thermal decomposition temperature of polyethylene oxide is about 200° C., polyethylene oxide cannot be added to a polyamide having a molding temperature of about 200° C. or greater.

SUMMARY OF THE INVENTION

The present invention is directed to polyamide resin compositions having improved sliding properties and having improved fluidity in the molten state for the more efficient manufacture of downsized molded members having a reduced wall thickness. The present invention provides an improved polyamide resin composition by including fibers of an aromatic polyamide and including a high-density polyethylene in a polyamide resin. The improved polyamide resin composition is used in the manufacture of sliding members that demonstrate excellent sliding properties, like mechanical properties and heat resistance. The improved polyamide resin composition also demonstrates excellent fluidity in the molten state and eliminates phase separation of polyethylene from the polyamide resin composition, thereby facilitating the manufacture of sliding members having a reduced wall thickness.

DETAILED DESCRIPTION OF THE INVENTION

The present invention provides an improved polyamide resin composition comprising from about 1 to about 80 parts by weight of an aromatic polyamide fiber; from about 3 to about 80 parts by weight of a polytetrafluoroethylene, hereinafter referred to as PTFE; and from about 1 to about 20 parts by weight of a high-density polyethylene, hereinafter referred to as HDPE, to 100 parts by weight of a polyamide resin.

In accordance with the present invention, the identity of the polyamide resin is not particularly limited. For example, the polyamide can be, but is not limited to, nylon 6, nylon 66, nylon 12, nylon 11, nylon 46, nylon 612 or a combination thereof Nylon 46, having the structural repeating unit expressed by —[NH—(CH$_2$)$_4$—NH—CO(CH$_2$)$_4$—CO]—$_n$, is the preferred polyamide resin because nylon 46 has excellent heat resistance and mechanical properties. A method of producing nylon 46 is disclosed in Japanese Patent Provisional Publication Nos. 56-14930, 56-149431 and 58-83029, and in Japanese Patent Publication No. 60-28843. In order to achieve the full advantage of the present invention, nylon 46 having a minimum relative viscosity ($\eta_{rel}$) of about 1.5, and, preferably a relative viscosity of from about 2.5 to about 5.0, measured at 30° C. in 97% sulfuric acid at a concentration of $10^{-2}$ grams of polyamide resin per ml (milliliter), is used as the polyamide resin.

The aromatic polyamide fiber used in the present invention is termed an "alamide fiber". Suitable aromatic polyamide fibers, include, but are not limited to, the commercially available fibers sold under the tradenames KEVLAR and NOMEX, available from E. I. DuPont de Nemours; TECHNOLA and KONEX, available from Teijin; ARENKA, available from Akuzo; or a combination thereof. The aromatic polyamide fiber included in the improved polyamide resin of the present invention preferably is a short fiber. The diameter of the aromatic polyamide resin is not critical, but preferably the diameter of the fiber is about 30 μm (millimicrons) or less. To achieve the full advantage of the present invention, the diameter of the fiber is 15 μm or less. It has been found that a fiber having a length of greater than about 6 mm (millimeters) adversely affects the fluidity of the molten resin and demonstrates a poor granuability in an extruder It is preferred that the aromatic polyamide fiber has a length of about 3 mm or less.

The aromatic polyamide fiber is added to the improved polyamide resin composition in an amount of from about 1 to about 80 parts by weight, and preferably in an amount of from about 1.5 to about 50 parts by weight to 100 parts by weight of the polyamide. To achieve the full advantage of the present invention from about 3 to about 20 parts by weight of the aromatic polyamide fiber is included to 100 parts by weight of the polyamide.

It has been demonstrated that mechanical strength and heat resistance are not sufficiently improved, and that improvement in self-abrasion loss due to sliding against a metal is insignificantly improved, when the aromatic polyamide fiber is present in an amount of less than about 1 part by weight to 100 parts of the polyamide. Conversely, when the amount of the aromatic polyamide fiber in the polyamide resin composition is greater than about 80 parts by weight per 100 parts of polyamide, the fluidity of the molten polyamide resin composition is not further improved and therefore the excess aromatic polyamide fibers are wasted.

The PTFE used in the present invention is in the form of a powder, preferably having a mean particle size of about 15 μm or less. To achieve the full advantage of the present invention, the PTFE is a powder having a mean particle size of about 10 μm or less. The lower limit of the mean particle size of the PTFE powder is not particularly limited. However, if the mean particle size of the PTFE powder is greater than about 15 μm, the surface of an article manufactured from a polyamide resin composition of the present invention is coarse. The PTFE is included in the polyamide resin composition in an amount ranging from about 3 to about 80 parts, and preferably from about 5 to about 50 parts, by weight to 100 parts of a polyamide. The particular amount of PTFE added to a polyamide resin composition of the present invention is related to the effects of addition, mechanical strength and dispersibility of the PTFE on the polyamide resin composition. If the amount of the PTFE included in the polyamide resin composition is less than about 3 parts by weight per 100 parts of a polyamide, the dynamic friction coefficient of the polyamide resin composition is not improved sufficiently. Conversely, if the amount of PTFE included in the polyamide resin composition is greater than about 80 parts by weight per 100 parts of a polyamide, the mechanical strength of the polyamide resin composition is lowered, and the self-abrasion loss from sliding over a metal surface is increased.

The amount of HDPE included in the polyamide resin composition of the present invention is in the range of from about 1 part to about 20 parts, and preferably from about 3 parts to about 10 parts by weight to 100 parts of the polyamide. It has been found that if the amount of HDPE is less than about 1 part by weight to 100 parts of the polyamide, the fluidity of the polyamide resin composition in the molten state is not improved. If the HDPE is present in the polyamide resin composition in an amount greater than about 20 parts by weight to 100 parts of the polyamide, rigidity and heat resistance of the polyamide resin composition are lowered significantly, and a laminar exfoliation of injection products is observed.

A polyamide resin composition of the present invention is manufactured, for example, by first adding a polyamide, an aromatic polyamide fiber, a PTFE and a HDPE to a mixer. Then admixing the ingredients with a Henshell mixer or tumbler, followed by melt-mixing with a batch kneader, a banbury mixer or single-screw or twin-screw extruder.

In order to impart further mechanical strength, heat resistance and sliding properties to a polyamide resin composition of the present invention, an inorganic filler or an organic filler, or a combination thereof, can be added to the polyamide resin composition to improve a particular property.

Well-known reinforcing fillers for rubber or plastics can be used as an inorganic filler. If the inorganic filler is a solid, the particular form of the solid is not critical, and accordingly any form, such as powder, fibrous powder, fiber, whisker or balloon can be used. However, solid inorganic fillers in the form of powder or whisker are preferred in order to achieve a sufficient reinforcing effect while maintaining a low friction coefficient and an abrasion resistance in the polyamide resin compositions of the invention.

Therefore, a suitable inorganic filler includes, but is not limited to, clay, calcined clay, talc, catalpo, silica, alumina, magnesium oxide, calcium silicate, asbestos, sodium aluminate, calcium aluminate, sodium aluminosilicate, magnesium silicate, aluminum hydroxide, calcium hydroxide, barium sulfate, potassium alum, sodium alum, iron alum, shirasu balloon, glass balloon, carbon black, coke breeze, zinc oxide, antimony trioxide, borate, borax, zinc borate, metallic powder, metallic whiskers, mica, graphite, titanium oxide, warastonite, carbon fiber, glass fiber, glass fiber powder, glass beads, calcium carbonate, zinc carbonate, hydrotalsite, iron oxide and combinations thereof. In addition, the aromatic polyamide fiber or the optional inorganic filler can be treated by various methods well-known in the art to further enhance the physical properties of the polyamide resin composition of the present invention.

The method of mixing the inorganic filler into the polyamide resin compound is not particularly limited. For example, a similar mixing method used to blend the polyamide, the aromatic polyamide fibers, the PTFE and the HDPE can be used.

In addition, other polymers, for example, such as polybutadiene, butadiene-styrene copolymer, acrylic rubber, ethylene-propylene polymer, ethylene-propylene-diene-methylene rubber (EPDM), denatured EPDM, styrene-butadiene block polymer, styrenebutadiene-styrene block polymer, styrene-butadiene-styrene radial terblock polymer, polypropylene, butadiene-acrylonitrile copolymer, polyvinyl chloride, polycarbonate, polyethyleneterephthalate, polybutyleneterephthalate, polyacetal, polyamide, polyester, epoxy resin, polyvinylidene fluoride, polysulfone, ethylene-vinyl acetate copolymer, polyisoprene, natural rubber, chlorinated butyl rubber, chlorinated polyethylene, polyphenylene sulfate resin, polyether-ether-ketone, polyphenylene oxide resin, styrene-methyl methacrylate copolymer, styrene-maleic anhydride copolymer, rubber denatured polyphenylene oxide resin, styrene-maleimide type copolymer, rubber denatured styrene-maleimide type copolymer, and combinations thereof can be included in the polyamide resin composition of the present invention. Furthermore, other optional ingredients, like a lubricant, such as molybdenum disulfide and silicon oil; a pigment; a flame resisting agent; an age resistor; a stabilizer; or a antistatic agent, can be included in the polyamide resin composition.

The polyamide resin composition of the present invention demonstrates excellent sliding properties. Therefore, the polyamide resin composition can be used in the manufacture of, for example, bushings, bearings, scoops, slipping, guide rails, sealing materials, switch parts, gears, cam and numerous other sliding members.

The following examples demonstrate the polyamide resin composition of the present invention. These examples are provided only to illustrate the present polyamide resin composition, and are not intended to limit the scope of the present invention as described herein.

EXAMPLES

The polyamide resin compositions prepared in the Examples, and the Comparative Experiments, were evaluated by the following test methods.

Test Methods

1. Tensile test:

Tensile properties were measured at a pulling velocity of 50 mm/min (millimeters/minute) in accordance with the procedure outlined in ASTM D 638.

2. Bending test:

Bending properties were measured at a bending velocity of 15 mm/min in accordance with the procedure outlined in ASTM D 790.

3. Thermal deformation temperature:

Thermal deformation temperature was measured at 264 psi (pounds per square inch) in accordance with the procedure outlined in ASTM D 648.

4. Friction-abrasion test:

A Suzuki friction-abrasion experimental apparatus was used, and aluminum was used as the metal.

A hollow, cylindrical resin-based test piece having outside diameter of 25.6 mm and inside diameter of 20.0 mm was used, and a metal piece of the similar shape was used in this test.

(a) Dynamic friction coefficient

The dynamic friction coefficient was measured under a load of 10 kg (surface pressure: 5 kg/cm$^2$ (kilograms/square centimeter)) and rotating velocity of 60 rpm (revolutions per minute).

(b) Abrasion loss

The weight loss of the resin-based test piece that was rotated under the load of 10 kg at a rotating velocity of 30 rpm for 20,000 times (total travel distance: 1.4 kilometers) was measured and defined by the specific abrasion loss calculated by the following Equation (1).

Equation (1):
Specific abrasion loss =

$$\frac{\text{Abrasion Weight}}{\text{(Travel Distance} \times \text{Contact Surface Pressure} \times \text{Contact Area} \times \text{Density)}}$$

5. Fluidity of the Molten Resin

The fluidity of the molten resin was measured by the length of spiral-form products (slab flow length). Measuring conditions were:

| | |
|---|---|
| Producing temperature: | 320° C. (290° C. for Example 8) |
| Mold temperature: | 80° C. |
| Wall thickness of products: | 2.0 mm |
| Injection pressure: | 600 kg/cm$^2$ |
| Injection velocity: | 30 cm$^3$/sec |

EXAMPLES 1-6

Nylon 46 having relative viscosity of 3.70, measured in 97% sulfuric acid at 30° C. and a concentration 10$^{-2}$ g/ml; polytetrafluoroethylene powder (PTFE) having mean particle size of 5 μm, i.e. FLUON L169, available from Asahi Glass; aromatic polyamide fiber A, having a 1 mm length and a 12 μm diameter, i.e. TECHNOLA T-322, available from Teijin; and high-density polyethylene (HDPE), i.e. HIZEX 3300F, available from Mitsui Petrochemical first were mixed in a tumbler according to the composition shown in Table 1. Then, the mixture was melt-mixed, for pelletization thereof, by using a twin-screw extruder, such as the IKEGAI PCM 45 II, available from Ikegai Tekko. Using these pellets of polyamide resin composition, various test pieces were prepared by injection molding, under a producing temperature of 300° C. and a mold temperature of 80° C. The physical properties of the test pieces were measured by the above-described test methods.

As shown in Table 1, the polyamide resin compositions of Examples 1-6 demonstrated excellent mechanical strength, heat resistance and sliding properties, and also demonstrated good fluidity in the molten state.

EXAMPLE 7

Nylon 46, PTFE, HDPE and the aromatic polyamide fiber B, having a fiber length of 0.6 mm and a diameter of 14 μm, available as KONEX from Teijin, were mixed according to the composition shown in Table 1, these were pelletized in a manner identical to Examples 1-6, and the physical properties were measured. As shown in Table 1, the polyamide resin composition demonstrated good mechanical strength, heat resistance and sliding properties, and also demonstrates good fluidity in the molten state.

EXAMPLE 8

A polyamide resin composition incorporating nylon 66 in place of nylon 46 was mixed and pelletized by the method described above in Examples 1-7. The composition of Example 8 also demonstrated good mechanical strength, heat resistance, sliding properties and fluidity in the molten state.

COMPARATIVE EXPERIMENTS 1-5

TABLE 1

| | | EXAMPLES | | | | | | | |
|---|---|---|---|---|---|---|---|---|---|
| | | 1 | 2 | 3 | 4 | 5 | 6 | 7 | 8 |
| Composition (by weight) | | | | | | | | | |
| Nylon 4, 6 | | 100 | 100 | 100 | 100 | 100 | 100 | 100 | |
| Nylon 66 | 1) | | | | | | | | 100 |
| Aromatic Polyamide Fiber A | 2) | 5 | 10 | 40 | 10 | 10 | 10 | | 5 |
| Aromatic Polyamide Fiber B | 3) | | | | | | | 10 | |
| Polytetrafluoroethylene | 4) | 20 | 20 | 20 | 20 | 10 | 50 | 20 | 20 |
| High-density Polyethylene | 5) | 5 | 5 | 5 | 15 | 5 | 5 | 5 | 5 |
| Tensile Strength (Kg/cm$^2$) | | 850 | 950 | 1320 | 850 | 1020 | 880 | 930 | 790 |
| Bending Strength (Kg/cm$^2$) | | 1050 | 1110 | 1740 | 1070 | 1180 | 1250 | 1180 | 1010 |
| Bending Elastic Modulus (Kg/cm$^2$) | | 29000 | 37500 | 49000 | 27500 | 31000 | 36000 | 31000 | 26000 |
| Izod Impact (Kg · cm/cm) | | 60 | 6.5 | 16.0 | 5.5 | 8.0 | 9.0 | 7.3 | 5.0 |
| Thermal Deformation Temperature 264 psi (°C.) | | 150 | 162 | 220 | 143 | 158 | 190 | 155 | 117 |
| Dynamic Friction Coefficient | | 0.11 | 0.21 | 0.25 | 0.15 | 0.22 | 0.13 | 0.16 | 0.20 |
| Abrasion Loss: (mm$^3$/Kg · Km) | | | | | | | | | |
| Resin | | $10 \times 10^{-3}$ | $10 \times 10^{-3}$ | $15 \times 10^{-3}$ | $10 \times 10^{-3}$ | $10 \times 10^{-3}$ | $30 \times 10^{-3}$ | $30 \times 10^{-3}$ | $30 \times 10^{-3}$ |
| Aluminum | | $1 \times 10^{-3}$ | $2 \times 10^{-3}$ | $4 \times 10^{-3}$ | $6 \times 10^{-3}$ | $4 \times 10^{-3}$ | $2 \times 10^{-3}$ | $4 \times 10^{-3}$ | $5 \times 10^{-3}$ |
| Slab Flow Length (cm) | | 48 | 46 | 43 | 62 | 47 | 45 | 47 | 47 |
| Appearance | | ○ | ○ | ○ | ○ | ○ | ○ | ○ | ○ |

1) Amilan CM3001; Toray
2) TECHNOLA T-322; Teijin
3) KONEX Cutfiber; Teijin
4) FLUON L169; Asahi Glass
5) HIZEX 3300F; Mitsui Petrochemical

TABLE 2

| | | COMPARATIVE EXPERIMENTS | | | | | | |
|---|---|---|---|---|---|---|---|---|
| | | 1 | 2 | 3 | 4 | 5 | 6 | 7 |
| Composition (by weight) | | | | | | | | |
| Nylon 4, 6 | | 100 | 100 | 100 | 100 | 100 | 100 | 100 |
| Aromatic Polyamide Fiber A | 1) | 10 | 10 | 10 | 0 | 80 | 10 | 10 |
| Polytetrafluoroethylene | 2) | 20 | 20 | 0 | 20 | 20 | 20 | 20 |
| High-density Polyethylene | 3) | 0 | 30 | 5 | 10 | 10 | | |
| Polypropylene | 4) | | | | | | 5 | |
| Low-density Polyethylene | 5) | | | | | | | 5 |
| Tensile Strength (Kg/cm$^2$) | | 1000 | 910 | 1230 | 810 | 1650 | 940 | 830 |
| Bending Strength (Kg/cm$^2$) | | 1160 | 980 | 1400 | 1100 | 2850 | 1130 | 1060 |
| Bending Elastic Modulus (Kg/cm$^2$) | | 38700 | 28200 | 31500 | 32000 | 53000 | 37700 | 37000 |
| Izod Impact (Kg · cm/cm) | | 5.3 | 4.4 | 8.0 | 6.0 | 18.0 | 6.5 | 6.0 |
| Thermal Deformation Temperature 264 psi (°C.) | | 170 | 92 | 85 | 120 | 235 | 171 | 125 |
| Dynamic Friction Coefficient | | 0.26 | 0.31 | 0.30 | 0.18 | 0.33 | 0.27 | 0.23 |
| Abrasion Loss: (mm$^3$/Kg · Km) | | | | | | | | |
| Resin | | $30 \times 10^{-3}$ | $20 \times 10^{-3}$ | $20 \times 10^{-3}$ | $20 \times 10^{-3}$ | $10 \times 10^{-3}$ | $20 \times 10^{-3}$ | $10 \times 10^{-3}$ |
| Aluminum | | $8 \times 10^{-3}$ | $20 \times 10^{-3}$ | $40 \times 10^{-3}$ | $10 \times 10^{-3}$ | $20 \times 10^{-3}$ | $16 \times 10^{-3}$ | $4 \times 10^{-3}$ |
| Slab Flow Length (cm) | | 40 | 71 | 50 | 55 | 34 | 42 | 45 |
| Appearance | | ○ | Ex* | ○ | Ex* | ○ | ○ | ○ |

1) TECHNOLA T-322; Teijin
2) FLUON L169; Asahi Glass
3) HIZEX 3300F; Mitsui Petrochemical
4) J 300; Mitsui Petrochemical
5) YUKARON YK-30; Mitsubishi Petrochemical
Ex*Laminer Exfoliation Nylon 46, PTFE, aromatic polyamide fiber and HDPE, as shown in Example 1-8, were mixed according to the proportion shown in Table 1 and pelletized in the same manner as Examples 1-8. The physical properties of the comparative polyamide resin were measured. The results are illustrated in Table 2.

Comparative Experiment 1 is an example of a polyamide resin composition absent HDPE. The resin of Comparative Experiment 1 exhibited insufficient fluidity in the molten state.

Comparative Experiment 2 is an example wherein the amount of HDPE is above the upper limit of the present invention. The resin exhibits a substantial decrease in mechanical strength and heat resistance. Also because the laminar exfoliation on the surface of products, the composition provides undesirable molded products.

Comparative Experiment 3 is an example of a composition absent PTFE. The composition of Comparative Example 3 exhibits a large dynamic friction coefficient and large specific abrasion loss of both the polyamide resin composition and the metal when the resin and the metal are in frictional contact, therefore making the composition of Comparative Example 3 undesirable in the manufacture of sliding members.

Comparative Experiment 4 is an example of a composition absent an aromatic polyamide fiber. The composition exhibits poor tensile strength and heat resistance.

Furthermore, laminar exfoliation of HDPE was observed on the surface of the products, therefore making the composition of Comparative Experiment 4 undesirable in the manufacture of sliding members.

Comparative Experiment 5 is an example wherein the amount of the aromatic polyamide fiber is outside the upper limit of this invention. The composition is unsuitable because the dynamic friction coefficient and specific abrasion loss of metal are increased in comparison to a composition of the present invention. Furthermore, fluidity of the resin in the molten state is poor, and improvement in fluidity of the molten resin is not achieved.

COMPARATIVE EXPERIMENT 6

Comparative Experiment 6 uses polypropylene, i.e. J300, available from Mitsui Petrochemical, in place of the HDPE used in Example 2. The polypropylene provides only a slight improvement in the fluidity of the molten resin. In addition, because the dynamic friction coefficient is high, the resin of Comparative Experiment 6 including polypropylene is not suitable for the manufacture of sliding members.

COMPARATIVE EXPERIMENT 7

Comparative Experiment 7 uses low-density polyethylene (LDPE), i.e. YUKARON YK-30, available from Mitsubishi Petrochemical, in place of the HDPE used in Example 2. The resin of Comparative Experiment 7 exhibits a significant decrease in mechanical strength and heat resistance, therefore making the composition unsuitable for the manufacture of sliding members.

It will be understood that the present disclosure has been made only by way of preferred embodiment and the numerous changes in details of construction, combination and arrangements in parts can be resorted to without departing from the spirit and scope of the invention as hereinunder claimed.

We claim:
1. A polyamide resin composition comprising:
   (a) 100 parts by weight of nylon 46,
   (b) from about 1 to about 80 parts by weight of a aromatic polyamide fiber,
   (c) from about 3 parts to about 80 parts by weight of a polytetrafluoroethylene, and
   (d) from about 1 part to about 20 parts by weight of high-density polyethylene.
2. The composition of claim 1, wherein the aromatic polyamide fiber has a diameter of about 30 millimicrons or less and a length of about 6 millimeters or less.
3. The composition of claim 1, wherein the aromatic polyamide fiber is present in an amount ranging from about 1.5 parts to about 50 parts by weight.
4. The composition of claim 1, wherein the polytetrafluoroethylene is present in an amount ranging from about 5 parts to about 50 parts by weight.
5. The composition of claim 1, wherein the polytetrafluoroethylene is a powder having a mean particle size of about 15 micrometers or less.
6. The composition of claim 1, wherein the high-density polyethylene is present in an amount ranging from about 3 parts to about 10 parts by weight.
7. The composition of claim 1, further comprising an inorganic filler, an organic filler or a combination thereof.
8. A shaped article comprising:
   (a) 100 parts by weight of nylon 46,
   (b) from about 1 part to about 80 parts by weight of a aromatic polyamide fiber,
   (c) from about 3 parts to about 80 parts by weight of a polytetrafluoroethylene, and
   (d) from about 1 part to about 20 parts by weight of high-density polyethylene.
9. The article of claim 8, wherein the aromatic polyamide fiber has a diameter of about 30 millimicrons or less and a length of about 6 millimeters or less.
10. The article of claim 8, wherein the aromatic polyamide fiber is present in an amount ranging from about 1.5 parts to about 50 parts by weight.
11. The article of claim 8, wherein the polytetrafluoroethylene is present in an amount ranging from about 5 parts to about 50 parts by weight.
12. The article of claim 8, wherein the polytetrafluoroethylene is a powder having a mean particle size of about 15 micrometers or less.
13. The article of claim 8, wherein the high-density polyethylene is present in an amount ranging from about 3 parts to about 10 parts by weight.
14. The article of claim 8, further comprising an inorganic filler, an organic filler or a combination thereof.

* * * * *

UNITED STATES PATENT AND TRADEMARK OFFICE
CERTIFICATE OF CORRECTION

PATENT NO. : 5,304,422

DATED : April 19, 1994

INVENTORS : TANABE ET AL.

It is certified that error appears in the above-identified patent and that said Letters Patent is hereby corrected as shown below:

Col. 2, line 58, "thereof Nylon 46" should be --thereof.  Nylon 46--.

Col. 3, line 21, "extruder It" should be --extruder. It--

Col. 9, line 43, "about 1 to about" should be --about 1 part to about--.

Signed and Sealed this

Twenty-sixth Day of July, 1994

Attest:

BRUCE LEHMAN

*Attesting Officer*　　　　*Commissioner of Patents and Trademarks*